A. CLEGG.
MEANS FOR PREVENTING HORSES' FRONT LEGS FROM KNOCKING TOGETHER.
APPLICATION FILED DEC. 2, 1907.
901,592.
Patented Oct. 20, 1908.
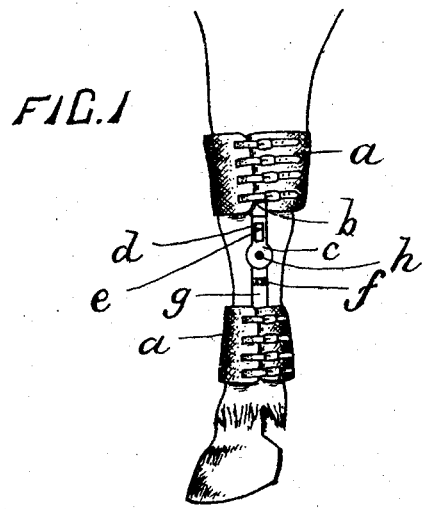
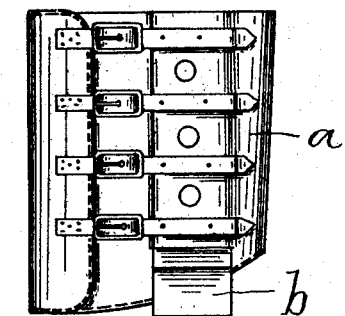
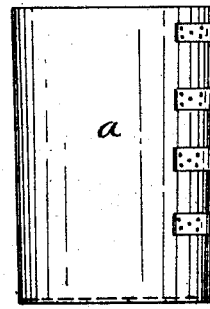
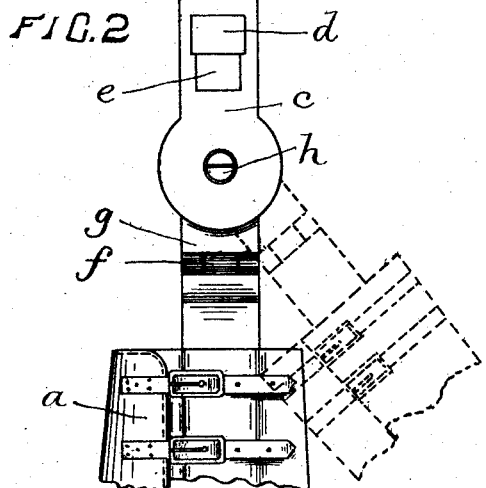
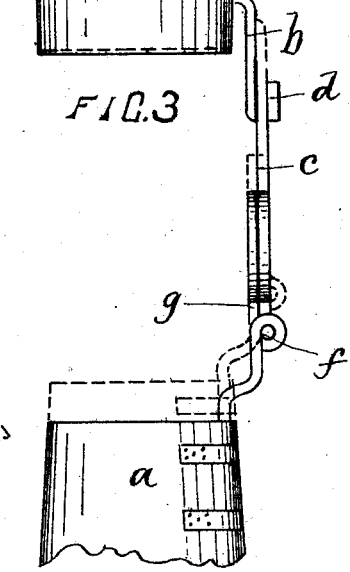

UNITED STATES PATENT OFFICE.

AMOS CLEGG, OF CHRISTCHURCH, NEW ZEALAND.

MEANS FOR PREVENTING HORSES' FRONT LEGS FROM KNOCKING TOGETHER.

No. 901,592.             Specification of Letters Patent.         Patented Oct. 20, 1908.

Application filed December 2, 1907. Serial No. 404,743.

*To all whom it may concern:*

Be it known that I, AMOS CLEGG, trainer, subject of the King of Great Britain, residing at Christchurch, in the colony of New Zealand, have invented a new and useful Improved Means for Preventing Horses' Front Legs from Knocking Together; and I do hereby declare the following to be a full, clear, and exact description of the same.

This invention provides means for preventing a horse from knocking its front legs together and thus causing injury to them.

It is a tendency with weak horses to lose control of their front legs while trotting, and allow them to swing inwards which causes the shoes to come into contact with the soft part of the legs and so bring about lameness. It is to overcome this occurrence that my invention has been designed. I provide means that will allow the horse's legs to swing in an outward, forward or backward direction, but prevent them from swinging inwards towards each other.

In describing the invention reference will be made to the accompanying drawings in which:—

Figure 1 shows a horse's leg with my invention attached thereto. Fig. 2 is an enlarged side elevation of my appliance and, Fig. 3 is a front view of same.

I provide two leather bands or straps $a$ $a$ one of which is buckled around the leg above the knee, while the other is fastened around the leg below the knee of the horse as clearly shown in Fig. 1 of the drawings. Rigidly attached to the upper band $a$ at a position on the outside of the leg is a short length of spring steel $b$ that extends down the leg for a short distance where it is attached to a second length of steel $c$ by means of a button or projection $d$ upon the first member $b$ that engages with a slotted aperture $e$ in the second member $c$. By this construction the two pieces $b$ and $c$ will be permitted to a vertical movement as the button or projection $d$ will be allowed to slide up or down within the slotted opening $e$. The lower end of this second member $c$ is pivoted at $h$ to a third length of spring steel $g$ that is rigidly attached to the lower band $a$ before mentioned, and extends upwards therefrom to a position approximately alongside the knee of the horse.

The third member $g$ is provided with a half hinge $f$ which enables it to be hinged outwards but be prevented from hinging in an inward direction. By means of the pivot joint $h$ a backward or forward movement will be permitted and to enable this movement to be carried out with ease and freedom the pivot joint $h$ is preferably provided with ball bearings in order to minimize the amount of friction between the two plates.

A similar attachment as that described is attached to the horse's other front leg, and it will thus be seen that the ordinary action required by a horse is not interfered with in any shape or form but at the same time the rigidness of the steel plates prevent the legs from swinging inwards to each other and causing injury. It is not altogether thought necessary to apply this attachment permanently to the horse's legs as it is thought that the appliance will enable the animal to get into the habit of using its front legs in the desired manner within a very short time.

Having now described my invention, what I claim as new and desire to secure by Letters Patent is:—

Means for preventing horses' front legs from knocking together, the same consisting of a pair of bands adapted to be secured around each leg, one above and one below the knee, a bar depending upon the outside of the upper band and formed with a stud projecting from its outer face, a metal plate formed with a slot extending longitudinally therein through which the stud is passed, a bar extending upwards from the lower band formed with a hinge allowing only of outward turning movement and hinged at its upper end to the lower end of the said plate in such a manner as to permit of turning movement in a plane at right angles to itself and said plate, substantially as specified.

Dated this 19th day of September, 1907.

In testimony whereof, I have signed this specification in the presence of two subscribing witnesses.

AMOS CLEGG.

Witnesses:
  PERCY RICHMOND CLIMIE,
  WILLIAM FRY.